United States Patent

Wilhelm et al.

[11] Patent Number: 5,730,421
[45] Date of Patent: Mar. 24, 1998

[54] APPARATUS FOR SERVICING A REACTOR SUCH AS TENSIONING REACTOR VESSEL HEAD STUDS

[75] Inventors: John J. Wilhelm, New Kensington; Bruce R.L. Cox, Springdale Township, Allegheny County; Richard J. Bodnar, Monroeville, all of Pa.

[73] Assignee: Westinghouse Electric Corporation, Pittsburgh, Pa.

[21] Appl. No.: 517,280

[22] Filed: Aug. 21, 1995

[51] Int. Cl.⁶ ....................................... E21B 19/00
[52] U.S. Cl. ........................................... 254/29 A
[58] Field of Search ................... 254/29 R, 29 A; 81/57, 38; 29/240, 446, 723

[56] References Cited

U.S. PATENT DOCUMENTS

| | | | |
|---|---|---|---|
| 2,072,747 | 3/1937 | Freese | 414/560 |
| 3,355,040 | 11/1967 | Guttridge | 414/542 |
| 3,421,635 | 1/1969 | Bunger | 212/129 |
| 3,851,906 | 12/1974 | Frisch et al. | |
| 3,933,388 | 1/1976 | Conboy | 414/561 |
| 4,047,456 | 9/1977 | Scholtz | 81/57 |
| 4,223,575 | 9/1980 | Krueger | 81/57.38 |
| 4,548,103 | 10/1985 | Orban | 81/57.38 |
| 4,552,038 | 11/1985 | Helermann et al. | 81/57 |
| 4,675,967 | 6/1987 | Okada | 29/240 |
| 5,164,151 | 11/1992 | Shah et al. | 376/260 |
| 5,295,167 | 3/1994 | Burner | 376/260 |

FOREIGN PATENT DOCUMENTS

| 0244426 | 10/1986 | Japan | 29/723 |
|---|---|---|---|

*Primary Examiner*—Robert C. Watson

[57] ABSTRACT

A stud tensioner for tensioning the upright studs which secure the head to a reactor pressure vessel is suspended by a motor operated hoist from a motor operated trolley mounted on a circular rail supported above the studs. A single operator operates the motor operated hoist and motor operated trolley, and manually radially fine aligns the stud tensioner for engagement with a stud through a control handlebar. A pair of side-by-side switches adjacent a first hand grip at one end of the handlebar enable the operator to operate the trolley to move the stud tensioner left or right, while vertically aligned switches adjacent a second hand grip at the other end of the handlebar are used to operate the hoist to raise and lower the stud tensioner. Simultaneously, the operator can radially maneuver the stud tensioner by applying force through the handlebar. An adjustable mount allows the handlebar to be rotated about a horizontal pivot axis and locked into a selected angular position relative to the tensioner.

11 Claims, 3 Drawing Sheets

APPARATUS FOR SERVICING A REACTOR SUCH AS TENSIONING REACTOR VESSEL HEAD STUDS

BACKGROUND OF THE INVENTION

1. Field of the Invention

This invention relates to apparatus for manipulating heavy equipment in a nuclear installation such as apparatus for tensioning the studs securing the hemispherical head to the pressure vessel of a nuclear reactor, and more particularly, to apparatus for manipulating the tensioner suspended by a motor operated hoist carried by a motor operated trolley mounted on a circular rail above the pressure vessel.

2. Background Information

The upright cylindrical pressure vessel of a nuclear reactor has at its upper end a radial flange to which a hemispherical head is clamped by nuts engaging a large number (usually more than 50) of angularly spaced studs threaded into the vessel flange and passing through aligned holes in a flange on the head. Controlled tension is applied to the studs while the nuts are threaded down against the head flange, so that when the tension is released, uniform pressure is applied to a gasket placed between the vessel and head flanges to provide a pressure seal for the vessel.

Tension is applied to the studs by a hydraulically operated tensioner, as is well known. Typically, the tensioner weighs several thousand pounds and is suspended by a hoist from a trolley which is mounted on a circular rail above the reactor vessel. Conventionally, the trolley is propelled along the rail by a manually operated chain drive, while the hoist is motor operated. Typically, two persons are required, and at times, three persons have been used, to position the tensioner over and engage it with each stud. In some cases, the tensioner engages two studs. One person operates the trolley chain drive to position the tensioner angularly over the stud(s) and the same person typically operates the hoist through a pendant to lower the tensioner on to the stud. While the circular rail generally radially aligns the tensioner, the second person manually pushes or pulls the tensioner, using u-shaped handles if provided, for final alignment with the stud(s). Care must be taken not to damage the threads on the stud(s), but at the same time, the job must be completed expeditiously to limit the workers' exposure to radiation and to help minimize the time that the reactor is out of service. Commonly owned U.S. patent application Ser. No. 08/280, 895, filed on Jul. 27, 1994, suggests utilizing a motor drive for the trolley in place of the chain drive and a mechanism which maintains the motor driven drive wheels in contact with an uneven rail.

Typically, three tensioners are operated simultaneously on studs 120° apart to provide even loading on the studs and therefore on the head gasket. Thus, three crews or six workers and supervisory personnel are required. In some instances, six tensioners are operated simultaneously requiring twelve workers plus a supervisor.

There is a need for improved apparatus for tensioning the head studs on a nuclear reactor pressure vessel which requires fewer workers, yet which permits the tensioning to be performed expeditiously.

There is a need for such apparatus which can be operated by a single worker per tensioner.

There is a related need for such apparatus in which the single operator can operate both the motor driven trolley and the motor driven hoist and also manually position the tensioner radially. There is a further need for such apparatus in which a single operator can operate the motor driven trolley, the motor driven hoist and manually position the tensioner radially simultaneously.

More generally, there is a need for improved apparatus for manipulating heavy equipment in a nuclear installation which can be operated by fewer persons.

SUMMARY OF THE INVENTION

These needs and others are satisfied by the invention which is directed to apparatus for aligning servicing means with a work piece in a nuclear environment and particularly to apparatus tensioning the head studs of a nuclear reactor pressure vessel which includes circular rail means supported above the upright cylindrical pressure vessel, a motor operated trolley mounted on the rail for movement therealong, a motor operated hoist carried by the trolley, a stud tensioner suspended from the trolley and raised and lowered by the motor operated hoist, and control grip means secured to the tensioner for manual radial alignment of the stud tensioner with the studs and having controls thereon for coordinating control of the motor operated trolley and the motor operated hoist with the manual radial alignment of the tensioner with the studs.

Preferably, the control grip means comprises hand grips and the controls comprise control switches mounted on the control grip means adjacent the hand grips. More specifically, the control switches comprise first control switches for operating the motor operated trolley adjacent the first hand grip, and second control switches for operating the motor operated hoist adjacent second hand grip. Most preferably, the control grip means comprises a handlebar with the hand grips being mounted on the end of the handlebars and with the control switches positioned adjacent the hand grips.

In the most preferred embodiment of the invention, the control grip means is secured to the stud tensioner by an adjustable mount. To this end, an elongated member extending transversely to the handlebar intermediate the handgrips is pivoted about a pivot pin horizontally supported by brackets secured to the tensioner. The elongated member is secured in selected angular positions about the pivot pin by locking means. The brackets include arcuate surfaces centered on the pivot axis of the pivot pin and have angularly spaced transverse slots. The locking means comprises a locking pin mounted transversely on the elongated member for movement axially along the elongated member and into engagement with a selected one of the transverse slots. The locking pin is spring biased toward the arcuate surfaces on the brackets and is released by an operating rod which is actuated from the handlebar.

With this arrangement, the operator grasps the hand grips and can operate the trolley with one hand, such as by using a thumb to operate a left or right switch, and can operate the motor operated hoist with the other hand, while simultaneously being able to push or pull on the hand grips to radially align the tensioner with the studs. Thus, one worker can perform the tasks previously requiring two workers. This reduces exposure of the workers to radiation, as the workers can alternate operating the apparatus singly. It also reduces the cost by reducing the number of workers required. At the same time the work can be accomplished as quickly, if not quicker than with previous arrangements.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

The invention will be described as applied to apparatus for tensioning the studs securing the head to the reactor pressure vessel in a nuclear power plant, but will be appreciated that the invention has application more generally to apparatus for coordinated manual and motor operated control of other equipment in a nuclear environment where operator presence is required but should be minimized to reduce exposure to radiation.

Figure 1:
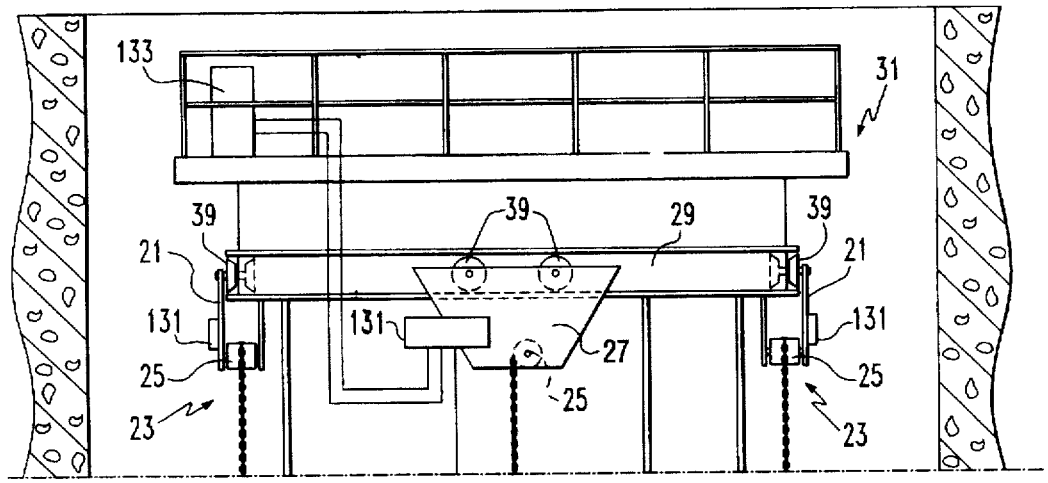
FIG. 1 is a partial elevation view with some parts in section showing a nuclear reactor pressure vessel mounted in a reactor cavity in a nuclear power installation, and showing apparatus adapted in accordance with the invention for tensioning studs which secure the head to the reactor vessel.
Figure 1:
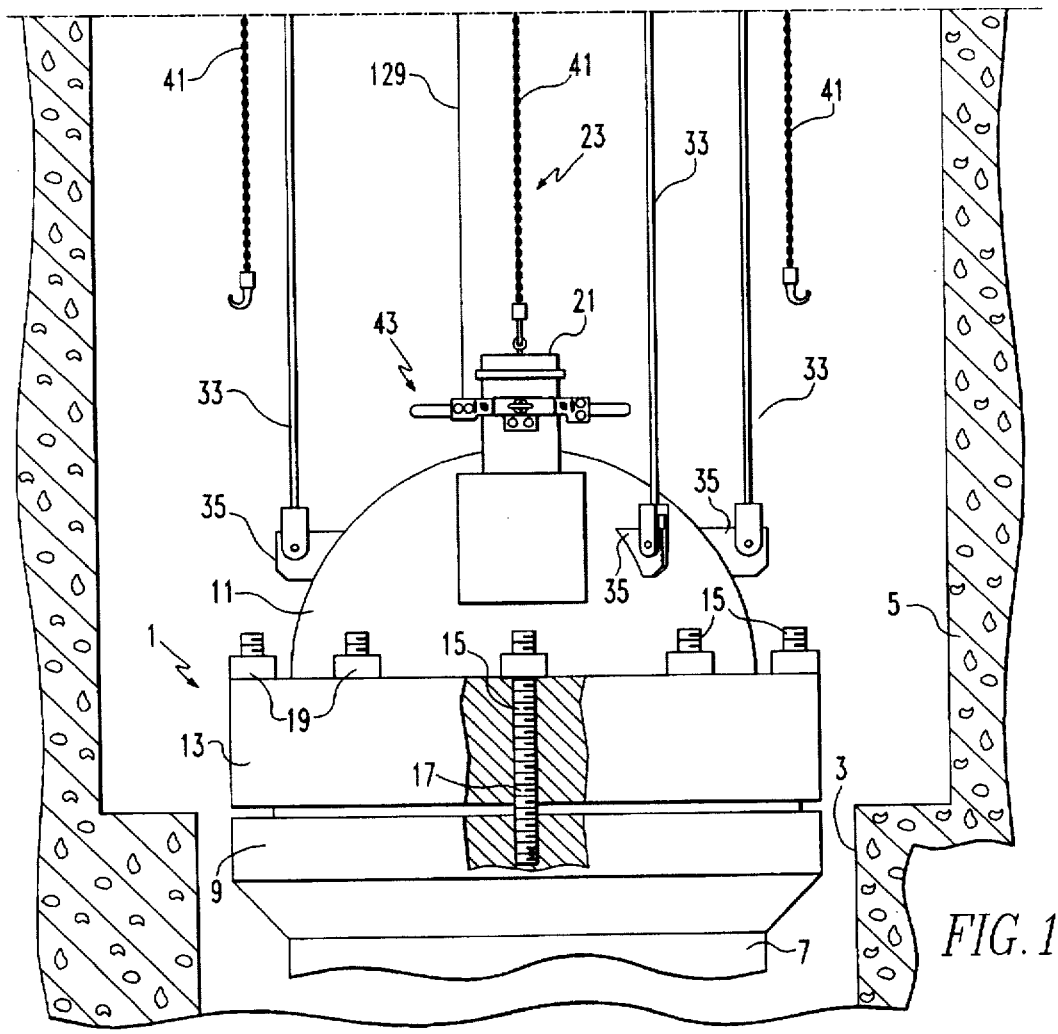

Referring to FIG. 1, a nuclear reactor 1 is shown in position in a reactor cavity 3 formed in a concrete biological shield 5 of a nuclear power plant. The nuclear reactor 1 comprises an upright cylindrical reactor pressure vessel 7 having a radially outward extending flange 9 at its upper end. The pressure vessel 7 is capped by a removable hemispherical head 11 having a radially outward extending flange 13 which is mated with the flange 9 on the pressure vessel by a number of upstanding studs 15 which are threaded into the flange 9 and extend upward through bores 17 in the head flange 13. Large nuts 19 are threaded onto the upper ends of the studs 15 to clamp gaskets (not shown) between the head flange 13 and vessel flange 9 to effect a pressure seal for the reactor 1.

Tension is applied to elongate the studs 15 within their elastic limit and the nuts 19 are threaded down against the head flange 13 so that when the tension is released uniform loading is applied to the gaskets. The tension is applied by a hydraulically operated tensioner 21 which is well known in the art. Such a tensioner released uniform loading is applied to the gaskets. The tension is applied by a hydraulically operated tensioner 21 which is well known in the art. Such a tensioner applies tension to one or more studs simultaneously. Usually, the operation of three stud tensioners engaging studs 120 degrees apart is coordinated to evenly load the gasket. A typical stud tensioner 21 for tensioning a single stud weighs in the neighborhood of 2,500 to 3,000 lbs. while dual stud tensioners can weigh 3,500 lbs. or more. In order to maneuver these heavy stud tensioners 21 for engagement with the studs 15 without damaging the threads, the stud tensioner is manipulated by apparatus 23 which includes a motor operated hoist 25 carried by a motor operated trolley 27 mounted on a circular rail 29 supported by a service platform 31. The platform 31 is supported by 3 posts 33 bolted to attachments 35 spaced 120° apart on the head 11. The circular rail 29 is preferably an I beam and the trolley 27 is preferably of the type described in copending U.S. patent application Ser. No. 08/280,895 having a pair of motors (not shown) driving wheels 39 which engage flanges on the rail 29. The stud tensioner 21 is suspended from the trolley 27 by the chain cable 41 of the motor operated hoist 25. Both the motor operated trolley 27 and the motor operated hoist 25 can be run and then jogged to position the stud tensioner 21 for engagement with the stud 15. However, due to tolerances it is necessary for the tensioner 21 to be manually accurately aligned for engagement with the stud 15.

Figure 2:
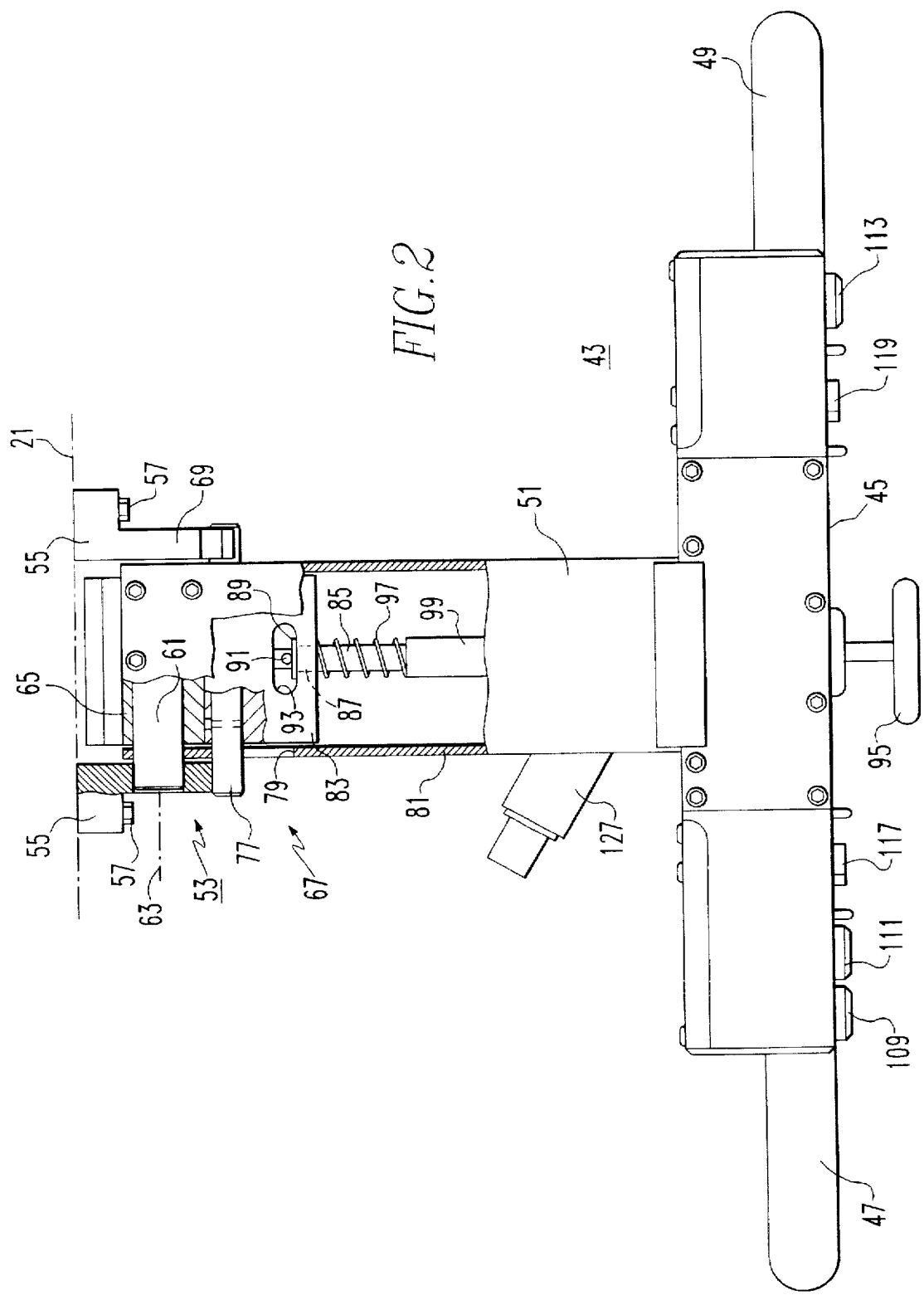
FIG. 2 is a top plan view of apparatus in accordance with the invention for controlling the stud tensioner shown in FIG. 1.
Figure 3:
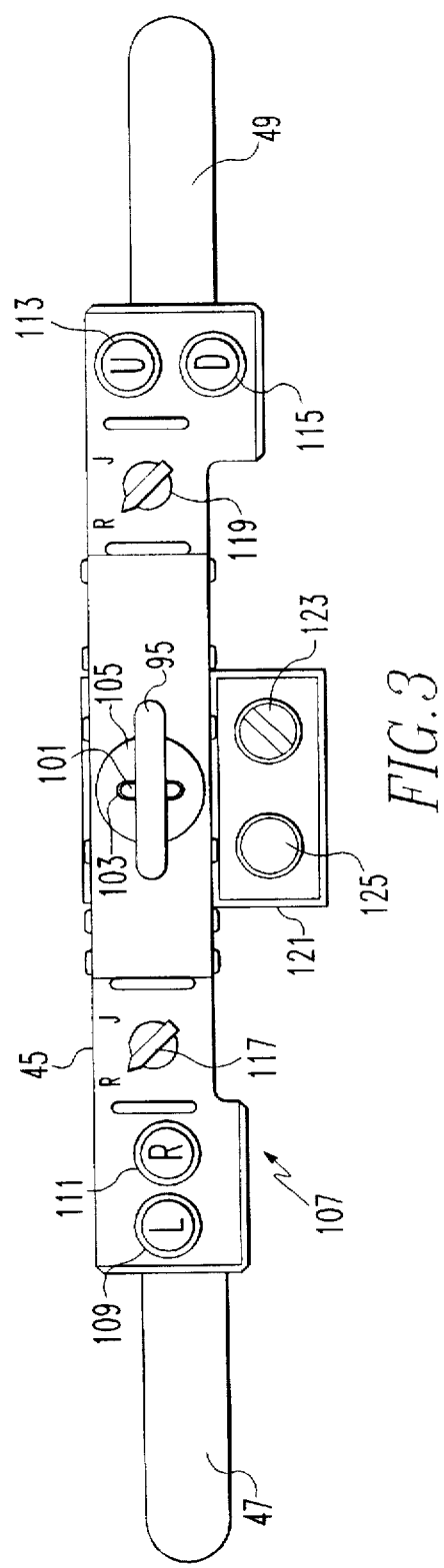
FIG. 3 is a front elevation view of the control apparatus of FIG. 2.
Figure 4:
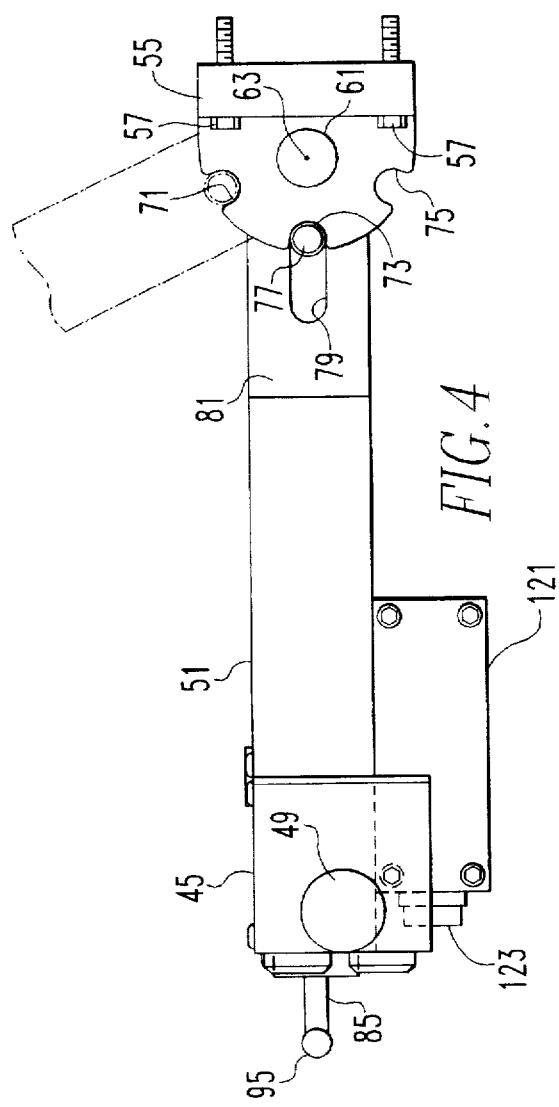
FIG. 4 is a side elevation view of the control apparatus.

In order that a single operator can control the motor operated hoist 25, and the motor operated trolley 27 while also manually positioning the stud tensioner 21, the control grip device 43 in accordance with the invention is provided. As best seen in FIGS. 2–4, the control grip device 43 includes a handlebar 45 having hand grips 47 and 49 on each end. The control grip device 43 also includes an elongated, box member 51 which extends transversely from the handlebar 45 intermediate the hand grips 47 and 49 to form with the handlebar 45 a T assembly. The other end of the elongated member 51 is secured to the body of the stud tensioner 21 by an adjustable mount 53. The adjustable mount 53 includes a pair of spaced apart brackets 55 rigidly secured to the tensioner by bolts 57. A sturdy pivot pin 61 is journaled in the brackets 55 to form a generally horizontal pivot axis 63. The elongated member 51 is pivotally mounted to rotate about the pivot pin 61 by pivot block 65. The elongated member 51 is firmly secured to the brackets 55 at selected angular positions by a locking mechanism 67. This locking mechanism 67, includes arcuate surfaces 69 on the brackets 55 having aligned angularly spaced transverse slots 71, 73, and 75 (see FIG. 4). The locking mechanism 67 also includes a locking pin 77 which slides transversely in longitudinal slots 79 in side walls 81 of the elongated member 51. The locking pin 77 is secured to a support block 83 slidable longitudinally within the elongated member 51. An operating rod 85 extends through a longitudinal bore 87 in support block 83 and is secured to the block by a fitting 89 secured to the rod by a screw 91 in slot 93 in the block.

The rod 85 extends through the elongated member 51 and beyond the handlebar 45 where it is provided with a handle 95. The support block 83 and therefore the locking pin 77 are biased toward the arcuate surface 69 on the brackets 55 by a biasing member in the form of a helical compression spring 97 which bears against the block 83 and a sleeve 99 through which the operating rod 85 extends. A catch in the form of a pin 101 (see FIG. 3) extending transversely from the rod 85 can pass through a slot 103 in a mounting plate 105 on the front of the handlebar 45 when the handle 95 is in the horizontal position so that the locking pin 77 can be disengaged from the slots 71–75 in the brackets 55. When the handle 95 is rotated 90°, the catch pin 101 holds the locking pin 77 in the retracted position so that the handlebar 45 can be raised or lowered to adjust the position of the handlegrip 47 and 49. In the exemplary embodiment, the handlebar 45 can be locked in three positions. When raised so that the locking pin engages the upper transverse slots 71, the handlebar 45 is locked in the stowed position. With the locking pin engaging the center slots 73, the handlebar 45 extends horizontally. With the locking pin engaging the lower slot 75, the stud tensioner 21 can be handled more easily when it is raised by the hoist. The adjustable mount 53 offers flexibility in positioning the handlebar 45 yet provides a solid connection for precise manual positioning of the stud tensioner 21.

The electrical controls 107 for the motor operated hoist 25 and the motor operated trolley 27 are provided on the handlebar 45. Preferably the controls for the motor operated trolley are placed adjacent one hand grip and those for the hoist are positioned adjacent the other hand grip so that the operator can easily operate each of the devices without confusion. Thus, left and right push button switches 109 and 111 are provided adjacent the hand grip 47 for controlling the trolley. These switches are placed side-by-side in correlation with the movement which they impart to the trolley the hoist 25. Both the trolley 27 and the hoist 25 can be operated at a run speed for gross alignment of the tensioner 21, and then jogged for fine alignment. Thus, run-jog switches 117 and 119, respectively, are mounted adjacent the trolley and hoist switches. A control box 121 mounted under the center of the handlebar 45 has an on-off switch 123 and a test light 125.

Referring to FIGS. 1 and 2, the controls 107 on the handlebar are connected through a connector 127 and a cable 129 to a junction box 131 on the trolley and to a control and power box 133 mounted on the service platform 31.

When it is desired to install or remove the head 11 from the pressure vessel 7, the motor operated trollies 27 for the three mechanisms 23 for supporting 3 tensioners 21 are mounted on the circular rail 29 with the tensioners 21 suspended by the chains 41 on the hoists. For each tensioner, the operating rod 85 is used to unlock the handlebar from the stowed position, and to relock the handle in the desired operating position. With the switches 117 and 119 in the run positions, the switches 109 and 111 are used to roughly align the tensioner 21 with the selected stud or studs 15. The switches 113 and 115 are then used to operate the hoist to position the tensioner 21 just above the stud. The switches 117 and 119 can then be moved to the jog position for more precise alignment of the tensioner. All of this is accomplished with the operator holding on to the handlebar 45 by the hand grips 47 and 49. The operator can then manually radially precisely align the tensioner 21 with the stud 15, and while holding the tensioner in that position jog it down onto the stud by actuating the down switch 115 with a thumb. Thus, a single operator can control the motor operated hoist 25 and the motor operated trolley 27 while simultaneously manually radially positioning the stud tensioner 21. This reduces the personnel required to perform the task, which translates into cost savings and reduced exposure to radiation.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. Apparatus for tensioning at least one upstanding stud securing a head to an upright cylindrical pressure vessel, said apparatus comprising:

rail means supported above said upright cylindrical pressure vessel;

a motor operated trolley mounted on said rail means for movement there along;

a motor operated hoist carried by said trolley;

a stud tensioner suspended from said motor operated trolley and raised and lowered by said motor operated hoist; and control grip means comprising first and second hand grips secured to said stud tensioner and having controls thereon comprising first control switches for operating said motor operated trolley positioned adjacent said first hand grip and second control switches for operating said motor operated hoist positioned adjacent said second hand grip, said control grip means having control switches for coordinating control of said motor operated trolley and said motor operated hoist with manual radial alignment of said stud tensioner.

2. The apparatus of claim 1 wherein said first control switches comprise left and right switches for left and right movement of said motor operated trolley mounted side-by-side, and said second control switches for said motor operated hoist comprise up and down switches for up and down operation of said motor operated hoist mounted with said up switch above said down switch.

3. The apparatus of claim 1 wherein said control grip means comprises a handlebar having a first end and a second end and wherein said first hand grip is mounted on said first end of said handlebar and said second hand grip is mounted on said second end of said handlebar.

4. The apparatus of claim 3 wherein said control grip means further includes an adjustable mount securing said handlebar to said stud tensioner in a plurality of selectable positions.

5. The apparatus of claim 4 wherein said adjustable mount comprises a pivot pin, bracket means securing said pivot pin to said stud tensioner to form a generally horizontal pivot axis, an elongated member pivotally mounted at a first end to said pivot pin for rotation about said generally horizontal pivot axis and secured at a second end to said handlebar intermediate said first and second ends of said handlebar, and locking means for locking said elongated member at selected angular positions about said pivot pin.

6. The apparatus of claim 5 wherein said bracket means includes an arcuate surface centered on said pivot axis and having angularly spaced transverse slots therein, and wherein said locking means comprises a locking pin mounted transversely on said elongated member for movement generally axially along said elongated member and into engagement with a selected one of said transverse slots.

7. The apparatus of claim 6 wherein said locking means further includes biasing means biasing said locking pin toward said first end of said elongated member to engage said selected one of said transverse slots, and an operating rod extending along said elongated member to said handlebar for moving said locking pin toward said second end of said elongated member to disengage said locking pin from said selected one of said transverse slots to release said elongated member for rotation about said pivot pin.

8. Apparatus for controlling manipulation of a stud tensioner for tensioning at least one up standing stud securing a head to a flange on an upright pressure vessel, wherein said stud tensioner is suspended by a motor operated hoist carried by a trolley mounted on a rail supported above said pressure vessel, said apparatus comprising:

control grip means secured to said stud tensioner for manual radial alignment of said stud tensioner with said at least one stud, including first and second hand grips and an adjustable mount securing said control grip means to said stud tensioner in selected orientations of said first and second hand grips relative to said stud tensioner; and controls mounted on said control grip means for coordinating control of said motor operated hoist with said manual radial alignment, said controls comprising switches adjacent at least one of said hand grips for operating said motor operated hoist.

9. The apparatus of claim 8 wherein said control grip means further includes a handlebar having a first end to which said first hand grip is secured and a second end to which said second hand grip is secured, and an elongated member extending generally transversely from said handlebar intermediate said first and second ends of said handlebar, and wherein said adjustable amount comprises a pivot pin to which said elongated member is pivotally connected, bracket means securing said pivot pin to said stud tensioner to form a generally horizontal pivot axis, and locking means for locking said elongated member at selected angular positions about said pivot pin.

10. The apparatus of claim 9 whereto said bracket means includes an arcuate surface centered on said pivot axis and having angularly spaced transverse slots therein, and wherein said locking means comprises a locking pin mounted transversely on said elongated member for movement generally axially along said elongated member and into engagement with a selected one of said transverse slots.

11. The apparatus of claim 10 wherein said locking means further includes biasing means biasing said locking pin toward said first end of said elongated member to engage said selected one of said transverse slots, and an operating rod extending along said elongated member to said handlebar for moving said locking pin toward said handlebar to disengage said locking pin from selected one of said transverse slots to release said elongated member for rotation about said pivot pin.

* * * * *